United States Patent
Ruebusch et al.

(10) Patent No.: US 8,474,841 B2
(45) Date of Patent: Jul. 2, 2013

(54) VEHICLE CONTROL SYSTEMS AND METHODS

(75) Inventors: Richard Ruebusch, Medina, OH (US);
Tim Obrzut, Parma, OH (US); Hans Hauser, Strongsville, OH (US); Axel Schaedler, Olmsted Township, OH (US)

(73) Assignee: MTD Products Inc, Valley City, OH (US)

(*) Notice: Subject to any disclaimer, the term of this patent is extended or adjusted under 35 U.S.C. 154(b) by 0 days.

(21) Appl. No.: 13/051,711

(22) Filed: Mar. 18, 2011

(65) Prior Publication Data

US 2011/0193307 A1    Aug. 11, 2011

Related U.S. Application Data

(62) Division of application No. 11/874,130, filed on Oct. 17, 2007, now Pat. No. 7,914,022.

(60) Provisional application No. 60/829,875, filed on Oct. 17, 2006.

(51) Int. Cl.
*B60G 7/00* (2006.01)

(52) U.S. Cl.
USPC ............................................. 280/93.502

(58) Field of Classification Search
USPC .... 180/401, 447, 6.24, 6.32–6.4; 280/93.502, 280/93.513
See application file for complete search history.

(56) References Cited

U.S. PATENT DOCUMENTS

| | | | |
|---|---|---|---|
| 1,794,241 A | 2/1931 | Patterson | 74/334 |
| 3,362,493 A | 1/1968 | Davis et al. | 180/6.32 |
| 3,398,819 A | 8/1968 | Ruhl et al. | 192/221 |
| 3,429,392 A | 2/1969 | Ryskamp | 180/6.3 |
| 3,572,033 A | 3/1971 | Tolley | 60/427 |
| 3,581,682 A | 6/1971 | Kontranowski | 180/55 |
| 3,865,208 A | 2/1975 | Crawshay et al. | 180/6.48 |
| 3,900,075 A | 8/1975 | Chichester et al. | 180/6.3 |
| 3,913,695 A | 10/1975 | Holdenried et al. | 180/6.48 |
| 4,339,966 A | 7/1982 | Kraus | 74/650 |
| 4,399,882 A | 8/1983 | O'Neill et al. | 180/6.48 |
| 4,572,310 A | 2/1986 | Peter | 180/6.24 |
| 4,852,679 A | 8/1989 | Fry | 180/234 |
| 4,875,536 A | 10/1989 | Saur et al. | 180/6.32 |
| 4,882,947 A | 11/1989 | Barnard | 475/23 |
| 4,969,533 A | 11/1990 | Holm et al. | 180/273 |
| 5,042,238 A | 8/1991 | White, III et al. | 56/11.8 |
| 5,078,222 A | 1/1992 | Hauser et al. | 180/6.48 |
| RE34,057 E | 9/1992 | Middlesworth | 180/6.2 |

(Continued)

FOREIGN PATENT DOCUMENTS

| | | |
|---|---|---|
| EP | 0 754 613 | 1/1997 |
| EP | 1 000 793 | 5/2000 |

(Continued)

OTHER PUBLICATIONS

"SST15, SST16, and SST18 Spin-Steer Technology™ lawn tractors," Litho in U.S.A., Apr. 2003.

(Continued)

*Primary Examiner* — Tashiana Adams
(74) *Attorney, Agent, or Firm* — Fulbright & Jaworski LLP

(57) ABSTRACT

Systems and methods for controlling the speed and direction of vehicles such as tractors.

6 Claims, 20 Drawing Sheets

U.S. PATENT DOCUMENTS

| | | | |
|---|---|---|---|
| 5,238,267 A | 8/1993 | Hutchison et al. | 280/781 |
| 5,263,901 A | 11/1993 | Kawakami et al. | 180/6.48 |
| 5,288,091 A * | 2/1994 | Deschamps | 180/409 |
| 5,529,135 A | 6/1996 | Wenzel et al. | 180/6.24 |
| 5,766,105 A | 6/1998 | Fellows et al. | 474/18 |
| 5,848,520 A | 12/1998 | Arfstrom et al. | 56/11.4 |
| 5,941,334 A | 8/1999 | Inagaki | 180/242 |
| 6,092,617 A | 7/2000 | White, III et al. | 180/338 |
| 6,129,164 A | 10/2000 | Teal et al. | 180/6.2 |
| 6,152,248 A | 11/2000 | Hidaka et al. | 180/6.38 |
| 6,196,342 B1 | 3/2001 | Teal et al. | 180/6.2 |
| 6,230,829 B1 | 5/2001 | Martin et al. | 180/6.3 |
| 6,256,357 B1 | 7/2001 | Oshima | 375/261 |
| 6,257,357 B1 | 7/2001 | Teal et al. | 180/6.2 |
| 6,301,864 B1 | 10/2001 | Damie et al. | 56/11.3 |
| 6,408,960 B1 | 6/2002 | Hidaka et al. | 180/6.38 |
| 6,434,919 B2 | 8/2002 | Schick | 56/15.9 |
| 6,447,419 B1 | 9/2002 | Irikura et al. | 475/24 |
| 6,456,925 B1 | 9/2002 | Romig | 701/93 |
| 6,540,633 B1 | 4/2003 | Hasegawa et al. | 475/24 |
| 6,554,085 B2 | 4/2003 | Hasegawa et al. | 180/6.26 |
| 6,601,663 B2 | 8/2003 | Hauser | 180/6.3 |
| 6,659,216 B2 | 12/2003 | Irikura et al. | 180/307 |
| 6,672,411 B1 | 1/2004 | Mouser | 180/6.32 |
| 6,688,090 B2 | 2/2004 | Velke et al. | 56/14.7 |
| 6,725,954 B1 | 4/2004 | Keane et al. | 180/6.48 |
| 6,729,115 B2 | 5/2004 | Bartel | 56/11.3 |
| 6,771,034 B2 | 8/2004 | Reile et al. | 318/139 |
| 6,808,032 B2 | 10/2004 | Wuertz et al. | 180/6.48 |
| 6,814,174 B2 | 11/2004 | Fluent et al. | 180/443 |
| 6,830,115 B2 | 12/2004 | Okada et al. | 180/6.2 |
| 6,874,305 B2 | 4/2005 | Ishimori | 56/10.8 |
| 6,904,985 B2 | 6/2005 | Ferree et al. | 180/6.3 |
| 6,905,985 B1 | 6/2005 | Schindzielorz et al. | 442/65 |
| 6,912,831 B2 | 7/2005 | Velke et al. | 56/10.9 |
| 6,921,109 B2 | 7/2005 | Hutchison et al. | 280/771 |
| 6,945,353 B2 | 9/2005 | Bishop | 180/443 |
| 6,951,259 B2 | 10/2005 | Irikura | 180/6.26 |
| 6,962,219 B2 | 11/2005 | Hauser | 180/6.2 |
| 7,004,268 B2 | 2/2006 | Irikura | 180/6.24 |
| 7,017,327 B2 | 3/2006 | Hunt et al. | 56/14.7 |
| 7,059,433 B2 | 6/2006 | Hasegawa et al. | 475/83 |
| 7,108,096 B1 | 9/2006 | Oxley et al. | 180/197 |
| 7,237,629 B1 | 7/2007 | Bland et al. | 180/6.24 |
| 7,347,434 B2 | 3/2008 | Lewis et al. | 280/99 |
| 7,395,912 B2 * | 7/2008 | Ooishi et al. | 192/99 S |
| 7,431,123 B2 | 10/2008 | Irikura et al. | 180/307 |
| 7,533,892 B2 * | 5/2009 | Schena et al. | 280/47.11 |
| 7,628,780 B2 | 12/2009 | Bonner et al. | 604/173 |
| 7,914,020 B2 | 3/2011 | Boston | 280/124.136 |
| 7,992,659 B2 * | 8/2011 | Schaedler et al. | 180/6.24 |
| 2003/0019682 A1 | 1/2003 | Schaedler et al. | 180/308 |
| 2006/0278446 A1 | 12/2006 | Oxley et al. | 180/6.24 |
| 2007/0144796 A1 | 6/2007 | Schaedler et al. | 180/6.24 |
| 2008/0136134 A1 | 6/2008 | McCoid et al. | 280/93.502 |
| 2011/0248462 A1 * | 10/2011 | Schaedler et al. | 280/93.513 |

FOREIGN PATENT DOCUMENTS

| | | |
|---|---|---|
| EP | 1 186 459 | 3/2002 |
| GB | 2015666 | 9/1979 |
| GB | 2303829 | 3/1997 |
| JP | 9-039822 | 2/1997 |
| WO | WO 03/100295 | 12/2003 |

OTHER PUBLICATIONS

Hidaka, "Development of forced differential steering control system," *Automation Technology for Off-Road Equipment, Proceeding of the Oct. 7-8, 2001 Conference*, Kyoto, Japan, Oct. 7, 2004.

* cited by examiner

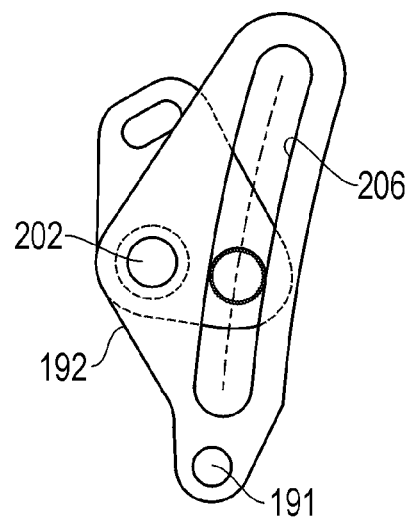
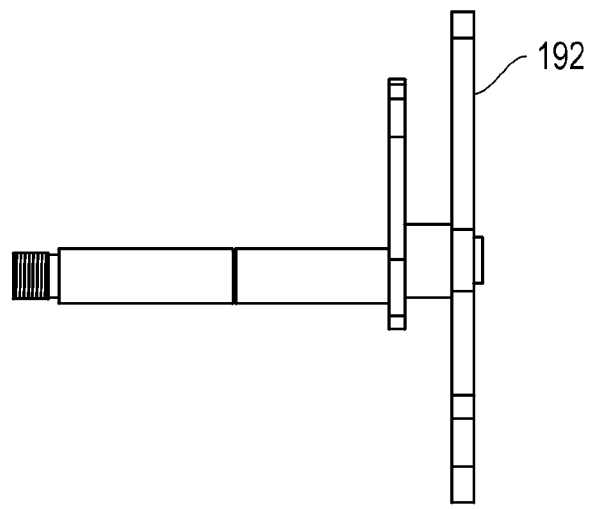
FIG. 9A          FIG. 9B
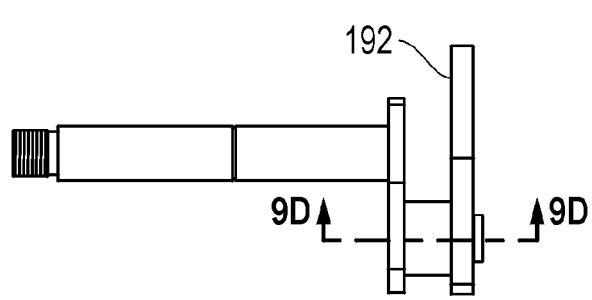
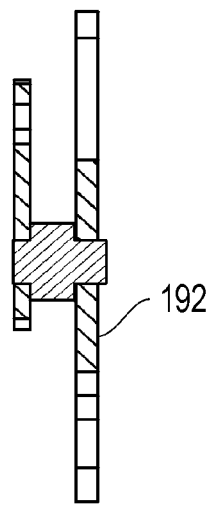
FIG. 9C          FIG. 9D

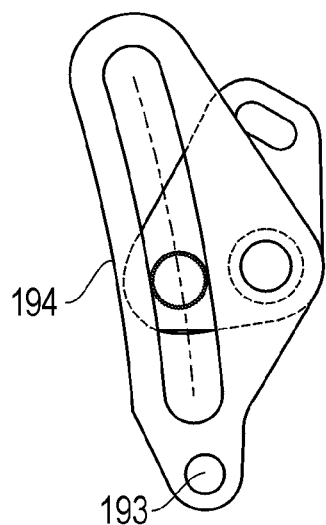
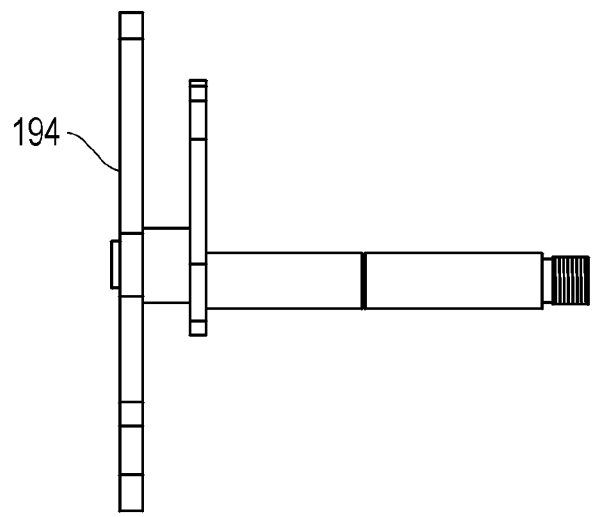
FIG. 10A    FIG. 10B
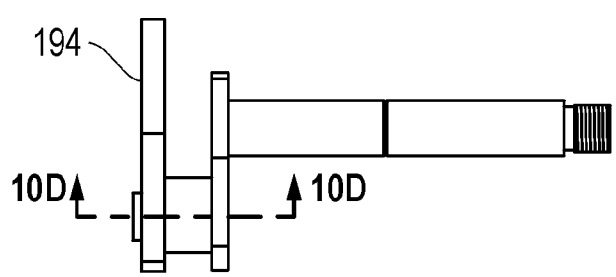
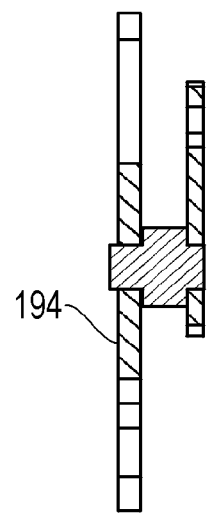
FIG. 10C    FIG. 10D

| 1 | 2 | 3 | 4 | 5 | 6 | 7 | 8 | 9 | 10 | 11 | 12 | 13 | 14 | 15 |
|---|---|---|---|---|---|---|---|---|---|---|---|---|---|---|
| Rack Measure (Inches) | Steering Wheel (Degrees) | Cam Rotation (Degrees) | Axle Ratio | Inside Steering Wheel Angle | Outside Wheel Speed Arm Position | Inside Wheel Speed Arm Position | Speed Arm Rotation (IN) | Follower Rotation 27/26(IN) | Speed Arm Rotation (OUT) | Follower Rotation (OUT) | Wheel Speed (Inside MPH) | Wheel Speed (Outside MPH) | Pintal Shaft Angle (Degrees) | Wheel Speed (MPH) |
| 1.683 | 9.8105 | 0.0000 | 1 | 0 | 1.9504 | 1.9504 | 0.0000 | 0.0000 | 0 | | 6.0000 | 6.0000 | -14 | 6.0000 |
| 1.504 | 52.6657 | 6.9558 | 1.126 | 10 | 1.9504 | 1.7321 | 3.8992 | 3.7548 | 0 | | 5.3286 | 6.0000 | -13 | 5.5714 |
| 1.166 | 133.5426 | 17.6377 | 1.261 | 20 | 1.9504 | 1.5467 | 7.0317 | 6.7713 | 0 | | 4.7581 | 6.0000 | -12 | 5.1429 |
| 0.959 | 183.0737 | 24.1795 | 1.417 | 30 | 1.9504 | 1.3764 | 9.7916 | 9.4289 | 0 | | 4.2343 | 6.0000 | -11 | 4.7143 |
| 0.791 | 223.2729 | 29.4889 | 1.61 | 40 | 1.9504 | 1.2114 | 12.3810 | 11.9224 | 0 | | 3.7267 | 6.0000 | -10 | 4.2857 |
| 0.658 | 255.0972 | 33.6921 | 1.875 | 50 | 1.9504 | 1.0402 | 14.9939 | 14.4386 | 0 | | 3.2000 | 6.0000 | -9 | 3.8571 |
| 0.521 | 287.8787 | 38.0217 | 2.303 | 60 | 1.7474 | 0.7587 | 19.2082 | 18.4968 | 3.6351 | 3.5005 | 2.3341 | 5.3754 | -8 | 3.4286 |
| 0.377 | 322.3351 | 42.5726 | 3.132 | 70 | 1.5339 | 0.4898 | 22.9450 | 22.0952 | 7.2411 | 6.9729 | 1.5067 | 4.7188 | -7 | 3.0000 |
| 0.265 | 349.1346 | 46.1121 | 5.967 | 80 | 1.3679 | 0.2293 | 26.6830 | 25.6947 | 9.9270 | 9.5593 | 0.7052 | 4.2082 | -6 | 2.5714 |
| 0.191 | 366.8413 | 48.4507 | Infinity | 88 | 1.2583 | 0.0000 | 29.9180 | 28.8099 | 11.6628 | 11.2308 | 0.0000 | 3.8708 | -5 | 2.1429 |
| 0.086 | 391.9658 | 51.7691 | -2.368 | 100 | 1.1027 | -0.4656 | 36.2188 | 34.8774 | 14.0486 | 13.5283 | -1.4323 | 3.3921 | -4 | 1.7143 |
| 0 | 412.5440 | 54.4869 | -1 | 108 | 0.9752 | -0.9752 | 43.6648 | 42.0476 | 15.9691 | 15.3777 | -3.0000 | 3.0000 | -3 | 1.2857 |
| | | | | | | | | | | | | | -2 | 0.8571 |
| | | | | | | | | | | | | | -1 | 0.4286 |
| | | | | | | | | | | | | | 0 | 0.0000 |
| | | | | | | | | | | | | | 1 | -0.4286 |
| | | | | | | | | | | | | | 2 | -0.8571 |
| | | | | | | | | | | | | | 3 | -1.2857 |
| | | | | | | | | | | | | | 4 | -1.7143 |
| | | | | | | | | | | | | | 5 | -2.1429 |
| | | | | | | | | | | | | | 6 | -2.5714 |
| | | | | | | | | | | | | | 7 | -3.0000 |

Total Rack Travel In One Direction
1.6831

FIG. 19

VEHICLE CONTROL SYSTEMS AND METHODS

CROSS-REFERENCE TO RELATED APPLICATIONS

This application is a divisional of co-pending U.S. patent application Ser. No. 11/874,130 filed Oct. 17, 2007, which claims priority to U.S. Provisional Patent Application Ser. No. 60/829,875, filed Oct. 17, 2006. The entire text of each of the above-referenced disclosures is specifically incorporated herein by reference without disclaimer.

BACKGROUND

The present invention relates in general to systems and methods for controlling the movement of vehicles, and more particularly to systems and methods of coordinating the steering and speed inputs from an operator to control the speed and direction of a vehicle.

SUMMARY

Certain embodiments of the present disclosure comprise a vehicle control system comprising: a first plate that has two cams and that rotates in a first plane; and a pair of drive cam plates coupled to the first plate, both drive cam plates being rotatable at the same time in response to a speed input. In specific embodiments, the first plate has a center of rotation, the two cams are slots in the first plate, and the slots are symmetrical about an axis passing through the center of rotation. In certain embodiments, the first plate may be gearless.

Other embodiments of the present disclosure comprise: a steering pinion; a sector gear that engages the pinion; a plate that is coupled to the sector gear, the plate having a pair of cams; two followers, one of which engages one of the cams and the other follower engages the other cam; and a linkage system coupled to the followers, the linkage system being coupled a transmission system. In certain embodiments, the linkage system includes two linkages, the transmission system includes two transmissions, and one linkage is coupled to and delivers a drive input to one of the transmissions and the other linkage is coupled to and delivers a drive input to the other transmission. In specific exemplary embodiments, each drive input is based on (i) a speed input or (ii) a speed input and a steering input. In certain embodiments, the plate has a center of rotation, the cams are slots in the plate, and the slots are symmetrical about an axis passing through the center of rotation. Certain embodiments may comprise a housing in which at least the steering pinion, the sector gear, the plate, and the followers are substantially sealed.

Certain embodiments of the present disclosure comprise a steering pinion; a rack that engages the pinion, each end of the rack being coupled to a steerable structure; a sector gear that engages the pinion; and a linkage system coupled to the sector gear such that rotating the steering pinion manipulates the linkage system, the linkage system being configured to provide at least one drive input to a transmission system. In specific exemplary embodiments, the linkage system includes two linkages, the transmission system includes two transmissions, and one linkage is coupled to and delivers a drive input to one of the transmissions and the other linkage is coupled to and delivers a drive input to the other transmission.

Certain exemplary embodiments of the present disclosure comprise a steering pinion; a sector gear that engages the pinion; an assembly coupling the sector gear to a pair of beveled gears; and a linkage system coupled to the beveled gears such that rotating the steering pinion manipulates the linkage system, the linkage system being configured to provide at least one input to a transmission system.

Additional exemplary embodiments of the present disclosure comprise a steering pinion; a sector gear that engages the pinion; a first plate coupled to the sector gear, the first plate rotating in a first plane in response to rotation of the steering pinion; and a pair of drive cam plates coupled to the first plate. In certain embodiments, the first plate has two slots, and the system also includes two followers where one follower rides in one of the slots and the other follower rides in the other slot. In specific embodiments, each drive cam plate may include a slot.

Additional embodiments of the present disclosure comprise a steering pinion; a rack that engages the pinion, each end of the rack being coupled to an Ackermann steering assembly; a sector gear that engages the pinion; a plate coupled to the sector gear, the plate having a pair of cams; two followers, one of which engages one of the cams and the other follower engages the other cam; two translating gears, one of which is coupled to one of the followers and the other translating gear is coupled to the other translating gear; two rotating gears, one of which engages one of the translating gears and the other engages the other translating gear; two steering arms, one of which is coupled to one of the rotating gears and the other steering arm is coupled to the other rotating gear, the two steering arms being able to rotate independently of each other; two drive cam plates, one of which is coupled to one of the steering arms and the other drive cam plate is coupled to the other steering arm; a shaft coupled to both drive cam plates; and a linkage system that couples the drive cam plates to a transmission system.

In specific embodiments, the linkage system includes two linkages, the transmission system includes two transmissions, and one linkage is coupled to and delivers a drive input to one of the transmissions and the other linkage is coupled to and delivers a drive input to the other transmission, where each drive input is based on either a speed input or on a speed input and a steering input. In certain embodiments, each drive cam plate includes a slot in which a drive cam plate follower rides, the position of each of the drive cam plate follower being controlled by one of the steering arms.

BRIEF DESCRIPTION OF THE FIGURES

FIGS. 9A-9D illustrate detailed views of a component of FIG. 1.

FIGS. 10A-10D illustrate detailed views of a component of FIG. 1.

FIG. 19 illustrates data relating to the geometric and physical relationship of various components in a vehicle control system.

DESCRIPTION OF ILLUSTRATIVE EMBODIMENTS

The terms "comprise" (and any form of comprise, such as "comprises" and "comprising"), "have" (and any form of have, such as "has" and "having"), "contain" (and any form of contain, such as "contains" and "containing"), and "include" (and any form of include, such as "includes" and "including") are open-ended linking verbs. As a result, a system or method that "comprises," "has," "contains," or "includes" one or more elements possesses those one or more elements, but is not limited to possessing only those one or more elements or steps. Likewise, an element of a system or method that "comprises," "has," "contains," or "includes" one or more features possesses those one or more features, but is not limited to possessing only those one or more features. Furthermore, a structure that is configured in a certain way must be configured in at least that way, but also may be configured in a way or ways that are not specified.

The terms "a" and "an" are defined as one or more than one unless this disclosure explicitly requires otherwise. The terms "substantially" and "about" are defined as at least close to (and includes) a given value or state (preferably within 10% of, more preferably within 1% of, and most preferably within 0.1% of). Metric units may be derived from the English units provided by applying a conversion and rounding to the nearest millimeter.

Unless otherwise noted, the figures and drawings included in this disclosure are to scale (in terms of proportions).

Figure 1:
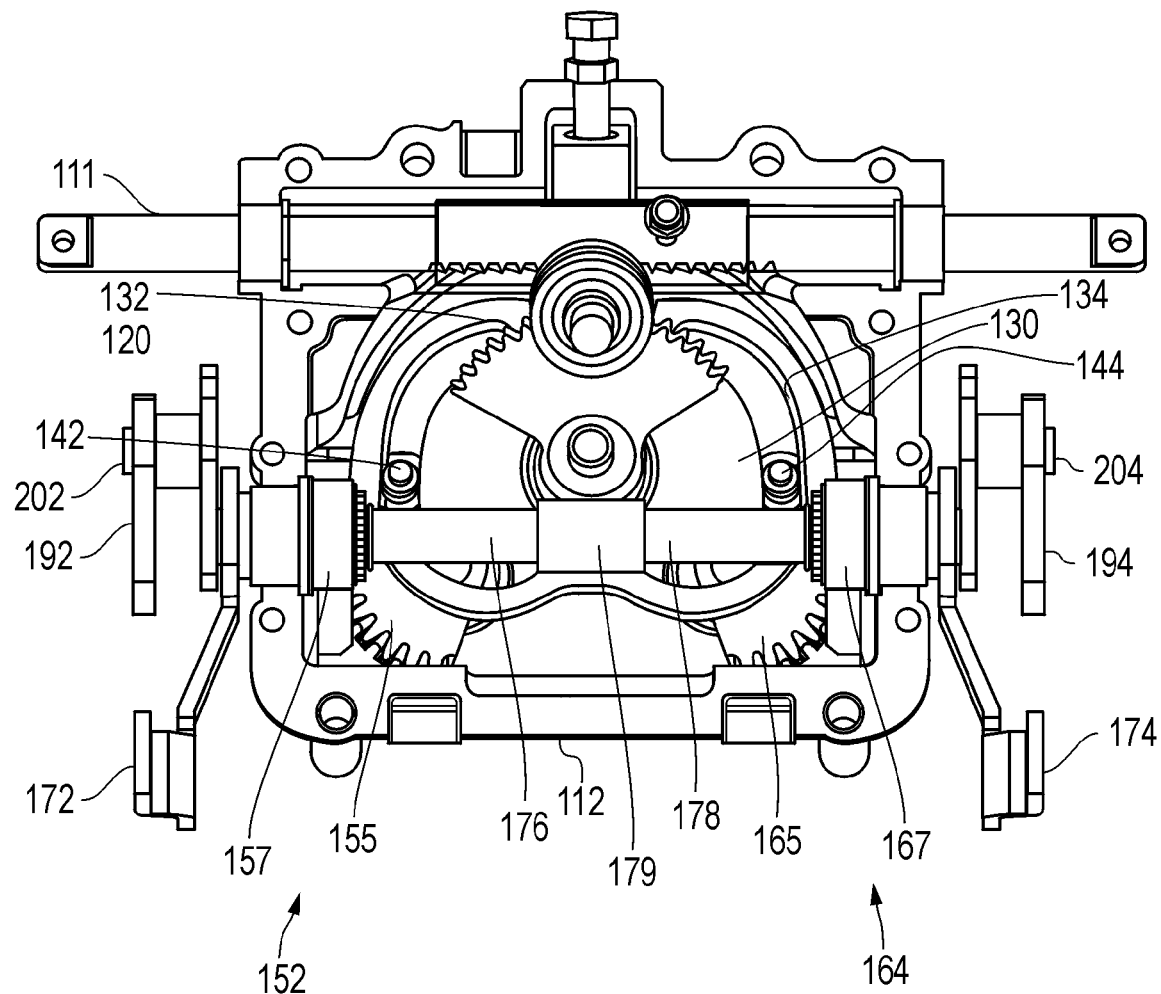
FIG. 1 illustrates a top view of one exemplary embodiment of a vehicle control system.

FIGS. 1-5 shows aspects of one embodiment of the present systems. FIG. 6 shows some additional aspects of another embodiment of the present systems. FIGS. 7-14B illustrate detailed views of individual components of the present systems. Referring initially to these figures, vehicle control system 100 comprises housing 112, steering shaft input pinion 110 (or, more broadly, steering pinion 110), sector gear 120, cam plate 130 (or, more broadly, plate 130) having a first cam slot 132 and a second cam slot 134, first follower 142, and second follower 144. First cam slot 132 may be characterized more generally as a first cam, and second cam slot 134 may be characterized more generally as a second cam. Vehicle control system 100 further comprises first bevel gear set 152 (which includes horizontal bevel gear 155 and vertical bevel gear 157) as well as second bevel gear set 164 (which includes horizontal bevel gear 165 and vertical bevel gear 167). In some embodiments, the horizontal bevel gears may be characterized as translating gears, and the vertical bevel gears characterized as rotating gears. System 100 also comprises first shaft 176 coupled to first steering arm 172, first speed cam or drive cam 192 (which may be coupled to first steering arm 172 through a linkage that includes one or more slots and pins), and second shaft 178 coupled to second steering arm 174, and second speed cam or drive cam 194 (which may be coupled to second steering arm 174 through a linkage that includes one or more slots and pins). In FIG. 1, the top portion of housing 112 has been removed to reveal the components inside.

During operation, steering pinion 110 meshes with sector gear 120, causing sector gear 120 to turn when steering wheel 101 is turned. Sector gear 120 (one embodiment of which is also shown in FIGS. 15-18) is coupled to plate 130 in such a manner that plate 130 turns when sector gear 120 is turned. Plate 130 rotates in a plane. For ease of illustration, this plane will be referred to as the "horizontal" plane and a plane perpendicular to this plane will be referred to as the "vertical" plane. In certain embodiments, input pinion 110 is oriented at a 26 degree angle to the plane in which plate 130 rotates. This nomenclature does not limit the orientation of vehicle control system 100 or its components, and other embodiments may include orientations other than those shown in FIG. 1. Slots 132 and 134 in plate 130 engage first follower 142 and second follower 144, respectively, causing them to move as plate 130 moves.

First follower 142 is coupled to first horizontal bevel gear 155, while second follower 144 is coupled to second horizontal bevel gear 165 (also shown in FIG. 6). Therefore, the movement of followers 142 and 144 causes the movement of horizontal bevel gears 155 and 165, respectively. Horizontal bevel gears 155 and 165 engage vertical bevel gears 157 and 167, respectively, and cause them to move when the horizontal bevel gears move. Vertical bevel gears 157 and 167 rotate in the vertical plane. Vertical bevel gears 157 and 167 are coupled to shafts 176 and 178, respectively, such that rotation of vertical bevel gears 157 and 167 causes shafts 176 and 178 to also rotate. First steering arm 172 and second steering arm 174 are coupled to shafts 176 and 178, respectively, and therefore rotate or pivot with shafts 176 and 178. Shafts 176 and 178 are capable of rotating independently of each other and each have their proximal ends supported by bearing 179. Bearing 179 may include flange bearings, sleeve bearings, ball bearings, or any other suitable bearing system that allows shafts 176 and 178 to rotate independently of each other.

As steering arms 172 and 174 move, a first link and a second link (which are coupled to steering arm 172 and 174, respectively) also move. These links are not shown in FIG. 1-5 but are shown as links 182 and 184 in FIG. 6. One end of link 182 is coupled to slot 206 of first drive cam 192 and one end of link 184 is coupled to slot 208 of second drive cam 194. Drive cams 192 and 194 also may be referred to as drive cam plates. As steering arms 172 and 174 pivot, links 182 and 184 change position within slots 206 and 208.

Each link 182, 184 is coupled to a drive rod 183, 185 (shown in FIG. 6). Each drive rod 183, 185 is coupled to a pintle shaft that delivers a drive input to a transmission (e.g., a hydrostatic transmission or a continuously-variable transmission (also referred to as an infinitely variable transmission)) that controls the direction and speed of rotation of a drive wheel of the vehicle. The drive input can be based on a speed input from an operator (e.g., such as a speed input delivered through movement of foot pedal 105, as discussed in more detail below), such as when the operator wishes to travel in a straight direction, or on both a speed input and a steering input, such as when the operator wishes to turn. The two transmissions in this example can be considered as components of a transmission system, and the drive rods and pintle shafts can be considered as components of a linkage system that delivers at least one drive input to the transmission system. The articulation of the steering input device (e.g., steering wheel 101) affects the position within cam slots 206 and 208 of a pair of links 182 and 184, which affect the drive input that will be transmitted to the transmission system through the drive rods and pintle shafts when the operator actuates the speed input (e.g., when he or she presses down on the gas pedal).

Figure 5:
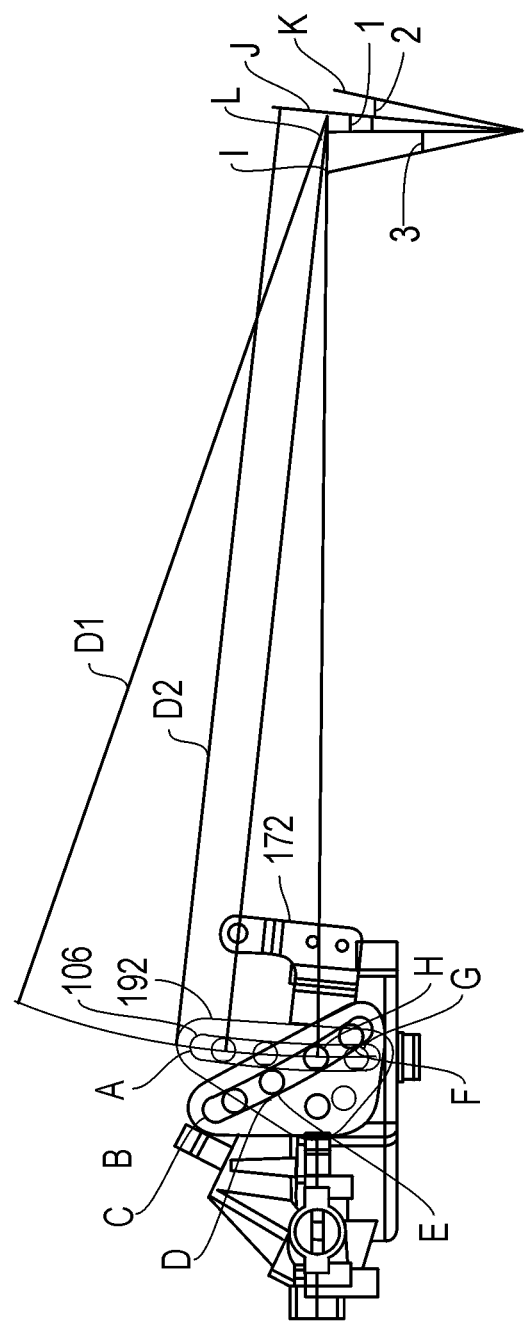
FIG. 5 illustrates a side view of the embodiment of FIG. 1.
Figure 6:
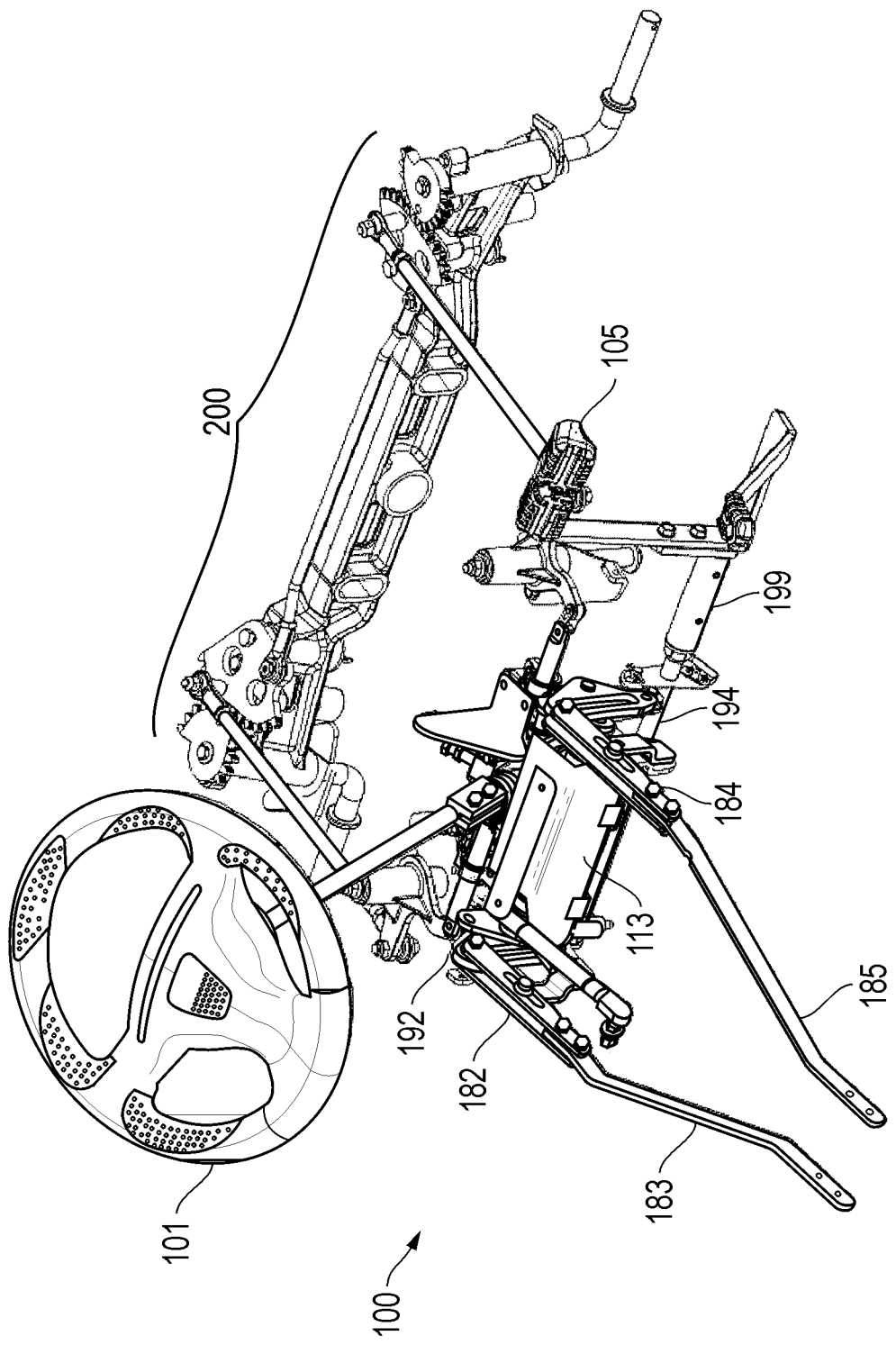
FIG. 6 illustrates a perspective view of the embodiment of FIG. 1 in addition to other components.

Various positions of the pin of one of these links in slot 206 of cam 192 are shown in FIG. 5, and this figure shows one manner in which cam 192 (and, as a corollary, cam 194) can rotate when an operator actuates the speed input. Cams 192 and 194 can also be configured to rotate about pins 202 and 204 (shown in FIGS. 2 and 3), respectively. In certain embodiments, pins 202 and 204 each have a crown to avoid binding. Such rotation can be effected by a shaft that is coupled to both cams 192 and 194, the rotation of which is controlled by the movement of the speed input. In the exemplary embodiment shown in FIG. 5, the center of arc A should be at a "gear neutral" position (i.e., a position where the transmissions are not transmitting torque to the drive wheels). When drive cam 192 and the pin within slot 206 are in position B, the system is in a neutral or straight ahead position. Position C illustrates the full forward throttle position for drive cam 192. Position D illustrates a throttle connection point for one embodiment. Position E illustrates the outside wheel zero position, while position F illustrates the inside wheel zero position. Position H illustrates the point at which drive cam 192 rotates. In certain embodiments, drive cam 192 may rotate approximately 31.5 degrees counter-clockwise for forward movement and 14.4 degrees clockwise for reverse.

In exemplary embodiments, distances D1 and D2 should be equivalent to prevent system 100 from providing a change in speed input to the transmissions when the steering wheel 101 is turned but foot pedal 105 has not been depressed. Line I indicates the maximum forward input, line J indicates the gear neutral position, Line K indicates the maximum reverse position, and line L indicates the midpoint between maximum forward and maximum reverse positions. In certain embodiments, angle 1 (between line L and line J) is 5.07 degrees, angle 2 (between lines L and K) is 12.18 degrees, and angle 3 (between lines L and I) is 12. 18 degrees. In exemplary embodiments, the distance between drive cam 192 and the gear neutral position should be known and consistent, in so that link 182 is in the desired location.

Such a shaft is shown as shaft 199 in FIG. 6; shaft 199 is coupled through links to both cams 192 and 194 at coupling points 191 and 193 (shown in FIGS. 9A and 10A), and the rotation of shaft 199 is controlled by operation of foot pedal 105. In other embodiments, shaft 199 may be coupled to cams 192 and 194 at other locations (for example, near the top of cams 192 and 194).

Plate 130 is configured such that the drive wheels of a vehicle can be controlled independently of each other. As a result, it is possible with the present systems to rotate one drive wheel (which also may be characterized as a ground engaging wheel) in one direction and another drive wheel in an opposition direction. In some instances, such a difference in directions makes it possible to achieve a low-radius turn, such as a turn known to those of ordinary skill in the art as a zero-radius turn. Further, it is possible with the present systems to rotate different drives in the same direction but at different rates.

Figure 7:
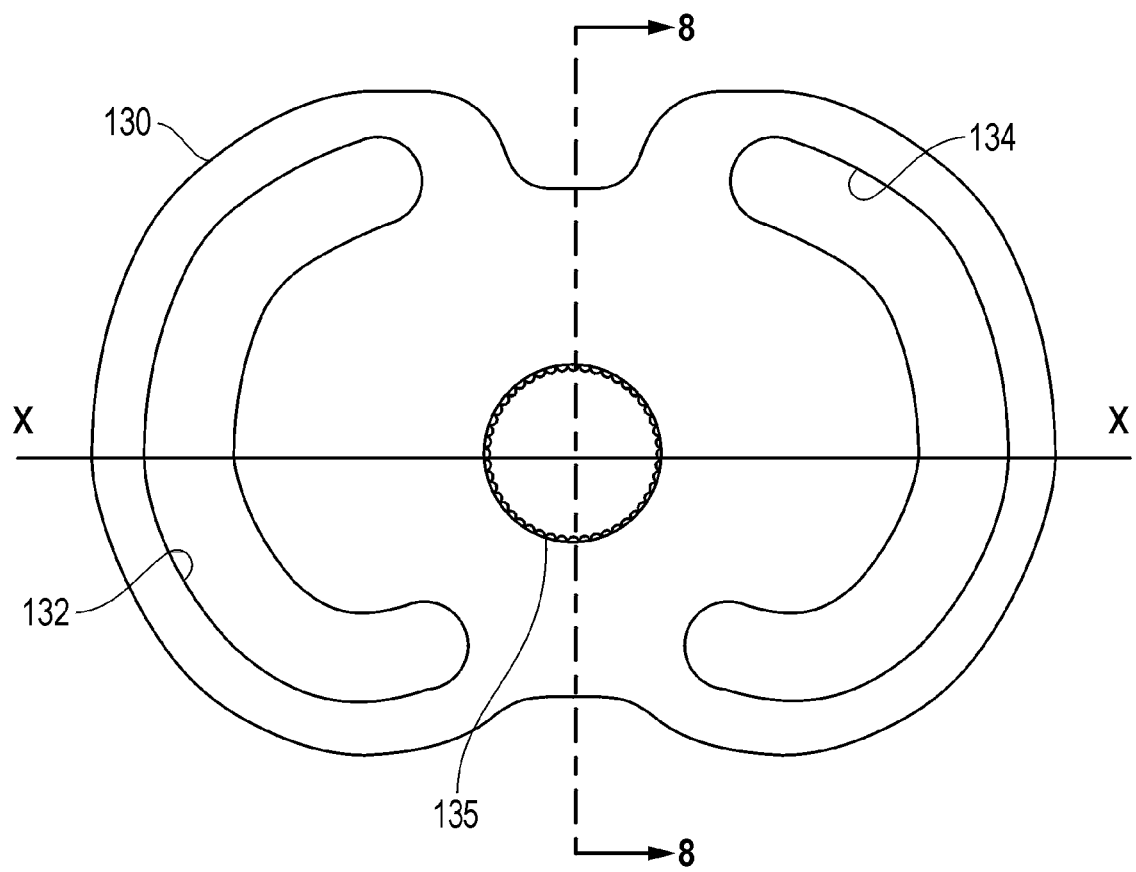
FIG. 7 illustrates a top view of a component of FIG. 1.
Figure 8:
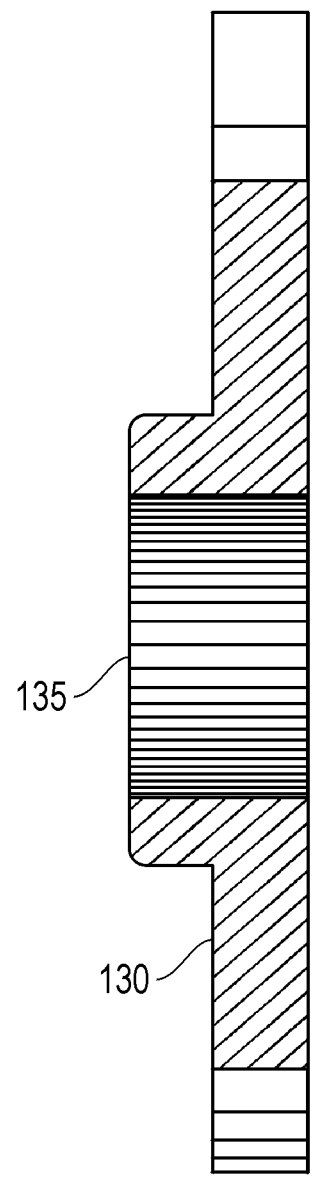
FIG. 8 illustrates a side view of a component of FIG. 1.
Figure 8C:
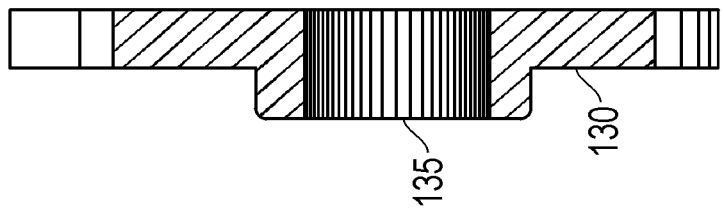
FIGS. 8A and 8B illustrate top and side views of an alternate embodiment of a vehicle control system component.
Figure 8B:
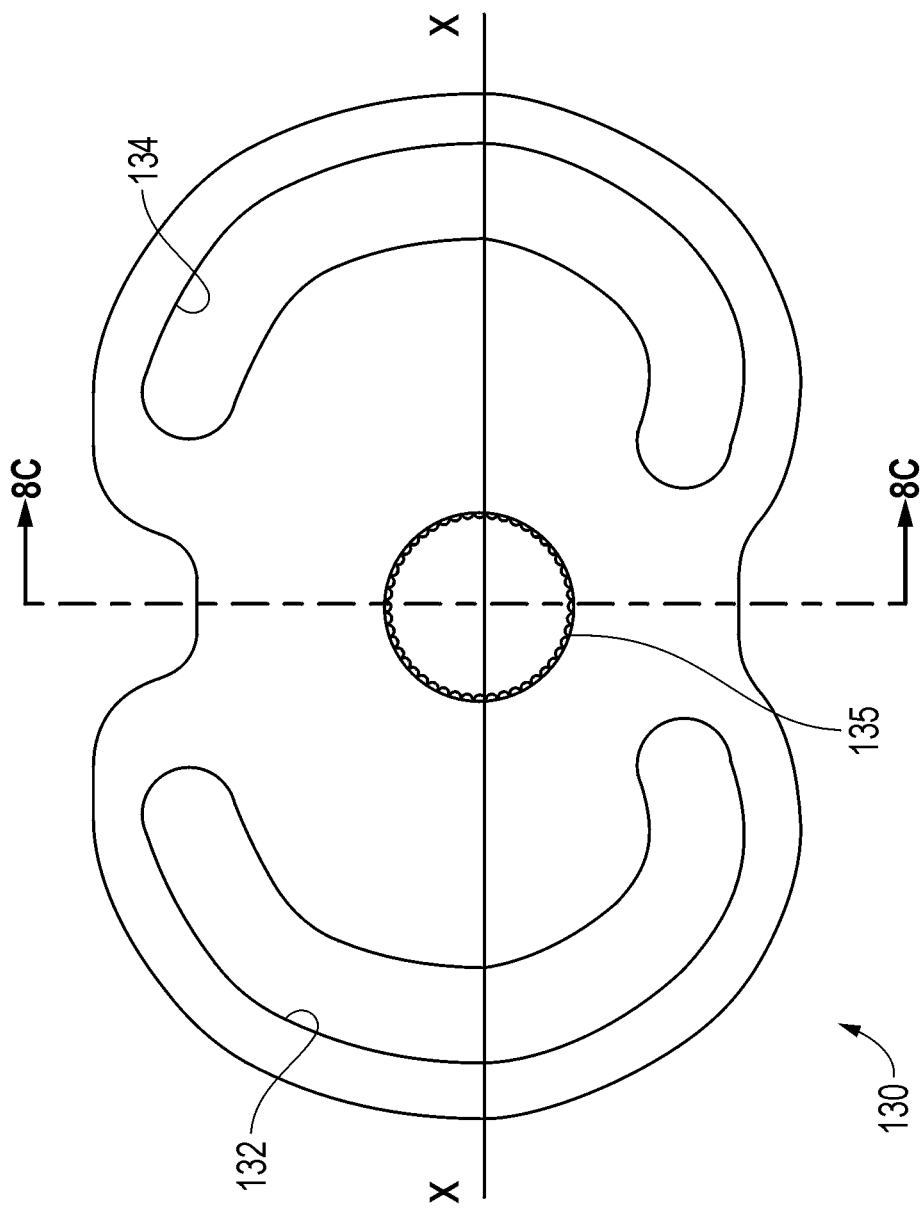

Referring now to FIG. 7, a top view of plate 130 is shown. A side section view of plate 130 taken along line 8-8 in FIG. 7 is shown in FIG. 8. In addition to slots 132 and 134, cam plate 130 includes a hole 135 with a spline fit that engages a shaft (not shown) that couples sector gear 120 to cam plate 130. As shown in FIG. 7, slots 132 and 134 are not symmetrical about axis X-X (which runs from slot 132, through the center of hole 135, and to slot 134). In other words, slot 132 is not equidistant from the center of hole 135 at all points along slot 132. Similarly, slot 134 is not equidistant from the center of hole 135 at all points along slot 134. Therefore, as cam plate 130 rotates, followers 142 and 144 (which engage slots 132 and 134, respectively) will not move equal distances. As a result, horizontal bevel gears 155 and 165 will move different amounts, causing vertical bevel gears 157 and 167 to move different amounts. This will in turn cause shafts 176 and 178 to rotate different amounts, leading to different displacements of steering arms 172 and 174. Consequently, links 182 and 184 will not have equal movement and the pintle shaft for each drive wheel will provide a unique drive input to the portion of the transmission system controlling the relevant drive wheel. A difference in rotational speed of the drive wheels of a vehicle can play a role in causing the vehicle to turn. Additional views of alternative embodiment of plate 130 are shown in FIGS. 8B and 8C.

In addition to providing the capability to cause the drive wheels of a given vehicle to rotate at different speeds and/or in different directions, vehicle control system 100 can also be configured to allow non-driving steerable structures (e.g., wheels) to assist in effecting a turn. For example, vehicle control system 100 can include a rack 111 (shown in FIGS. 1-4) that engages steering pinion 110. The ends of rack 111 may be coupled to an Ackermann steering system 200, such as the one shown in FIG. 2B. Alternatively, rack 111 may be coupled to another other steering system suited for the vehicle's particular application.

Figure 2:
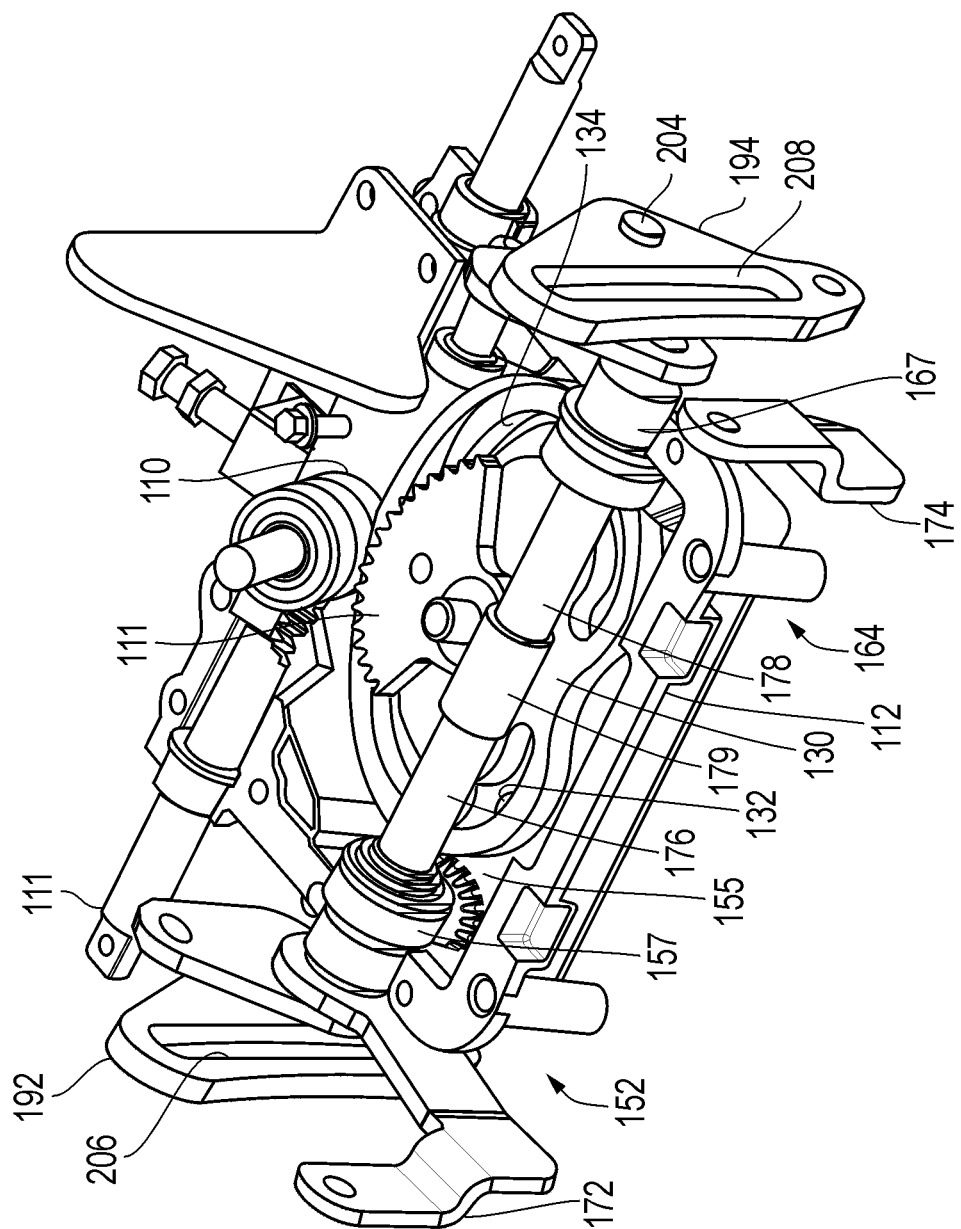
FIG. 2-4 illustrate perspective views of the embodiment of FIG. 1.
Figure 3:
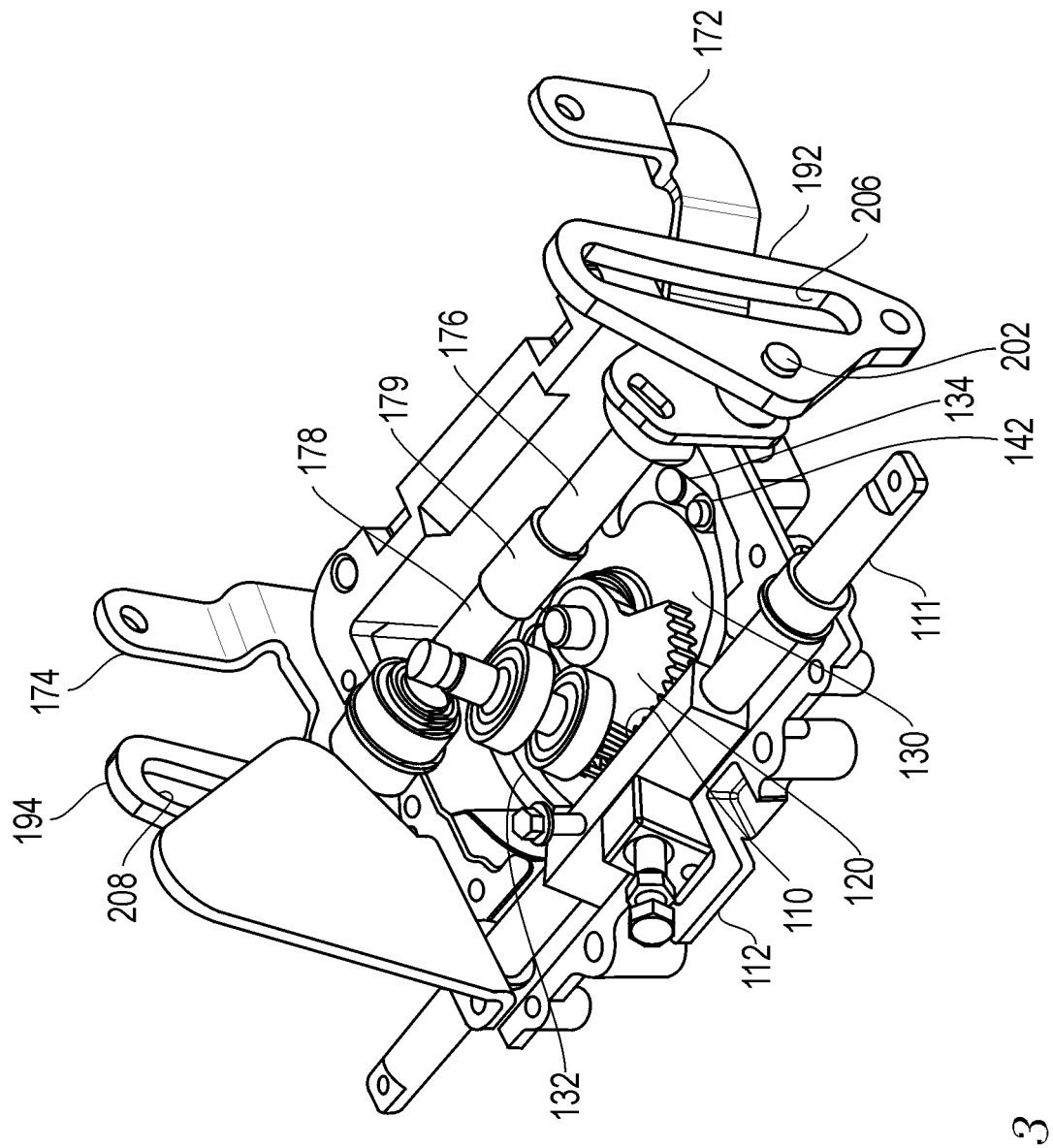
Figure 4:
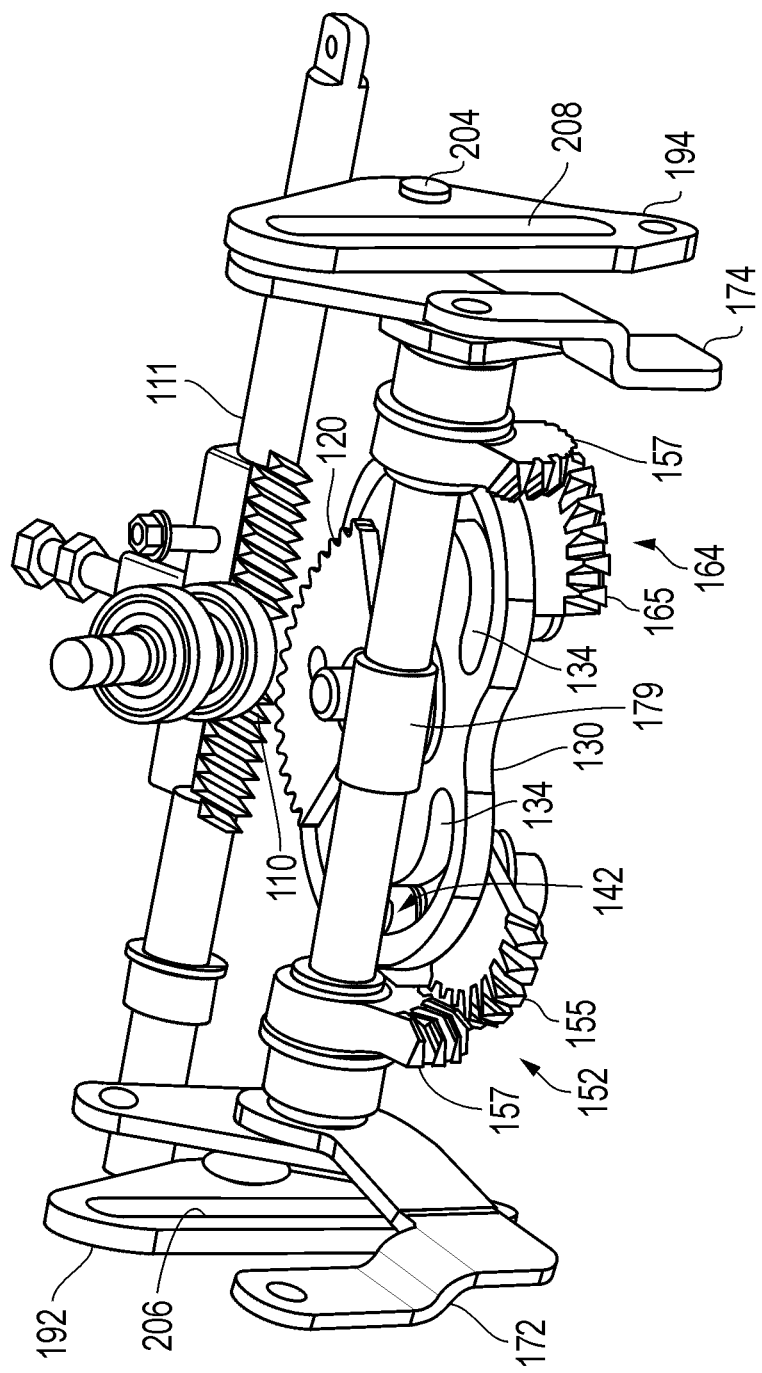

The present vehicle control systems, which also may be characterized as steering and speed coordination systems, may include a housing that provides a substantially sealed environment (which can be grease-packed) for certain components of the system, such as plate 130, steering pinion 110, sector gear 120, first and second followers 142 and 144, first and second bevel gear sets 152 and 164, at least a portion of first shaft 176, and at least a portion of second shaft 178. A lower portion 112 of such a housing is shown in FIGS. 1-3. A top portion 113 of such a housing is shown in FIG. 6. The top portion of the housing has been removed in FIGS. 1-3 to allow the internal components to be shown. Sealing the various geared components from outside atmospheric conditions may allow for reliable operation and reduce maintenance requirements of vehicle control system 100.

FIGS. 9A-9D illustrate detailed views of one embodiment of a drive cam 192. FIG. 9A illustrates a front view, FIG. 9B illustrates a side view, FIG. 9C illustrates a top view, and FIG. 9D illustrates a section view taken along line 9D-9D in FIG. 9C.

FIGS. 10A-10D illustrate detailed views of one embodiment of a drive cam 194. FIG. 10A illustrates a front view, FIG. 10B illustrates a side view, FIG. 10C illustrates a top view, and FIG. 10D illustrates a section view taken along line 10D-10D in FIG. 10C.

Figure 11A:
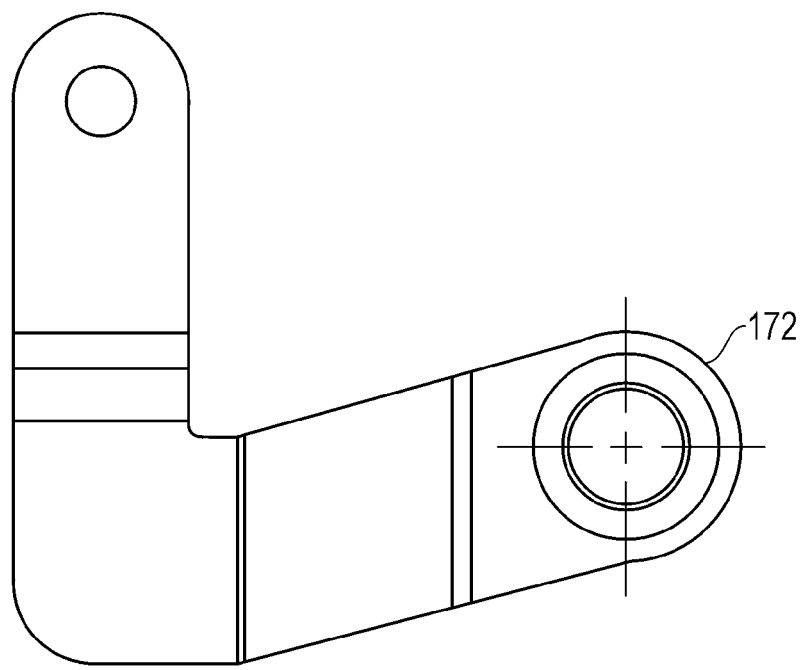
FIGS. 11A-11B illustrate detailed views of a component of FIG. 1.
Figure 11B:
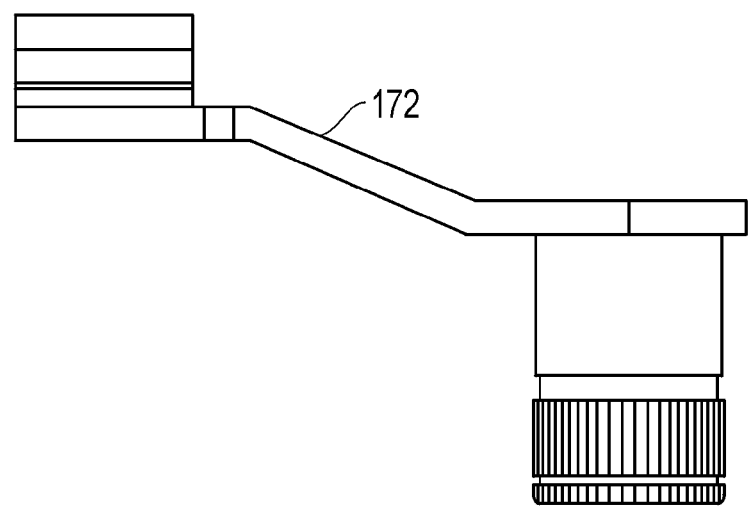

FIGS. 11A-11B illustrate detailed views of first steering arm 172. FIG. 11A illustrates a front view of steering arm 172, while FIG. 11B illustrates a top view of steering arm 172.

Figure 12A:
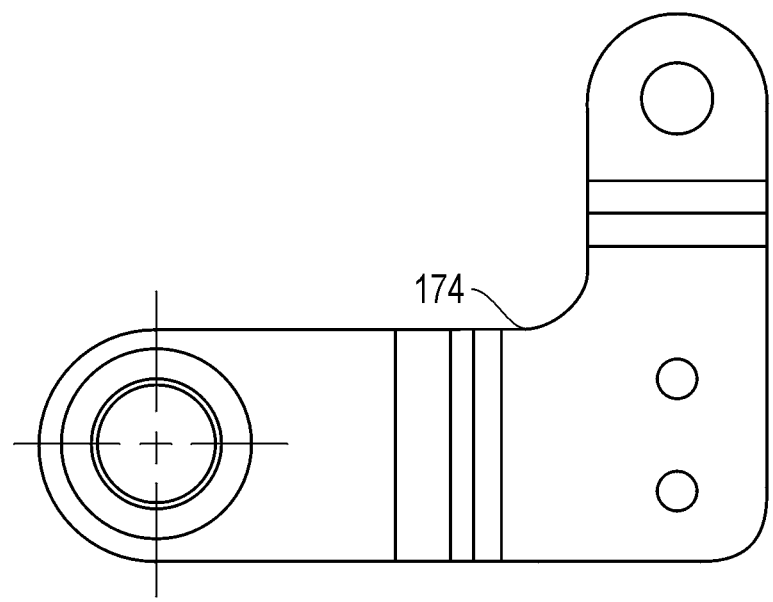
FIGS. 12A-12B illustrate detailed views of a component of FIG. 1.
Figure 12B:
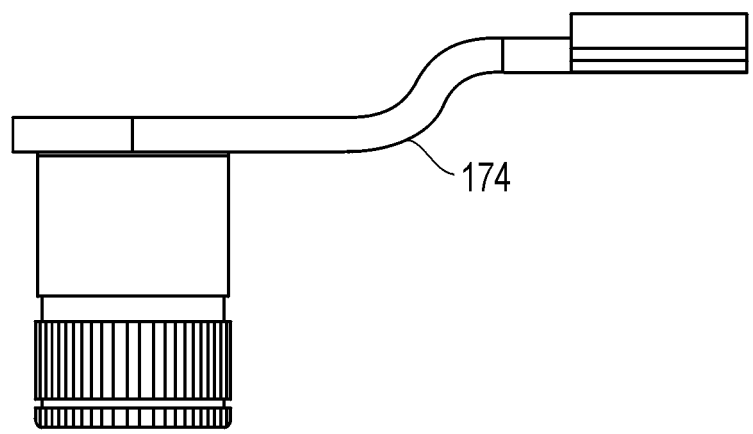

FIGS. 12A-12B illustrate detailed views of first steering arm 174. FIG. 12A illustrates a front view of steering arm 174, while FIG. 11B illustrates a top view of steering arm 174.

Figure 13B:
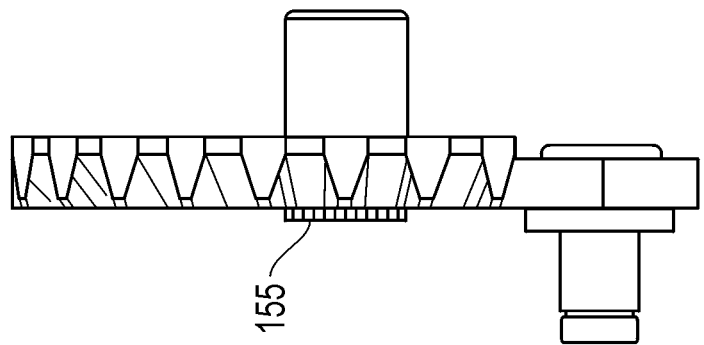
FIGS. 13A-13B illustrate detailed views of a component of FIG. 1.
Figure 13A:
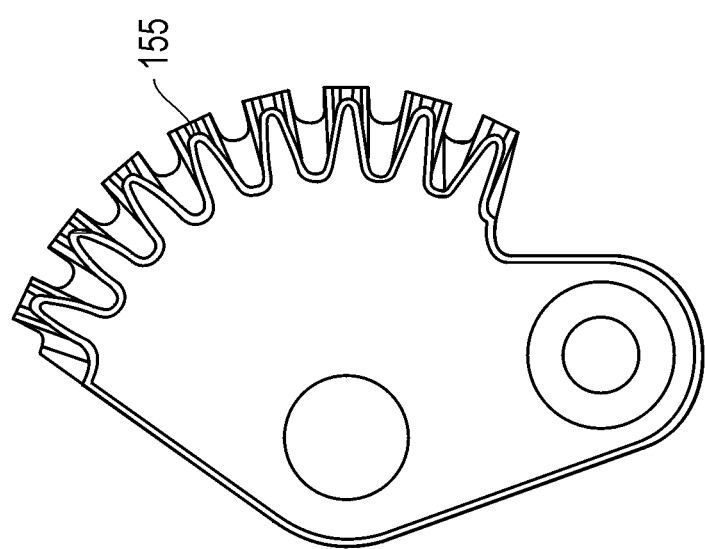

FIGS. 13A-13B illustrate detailed views of horizontal bevel gear 155. FIG. 13A illustrates a top view of horizontal bevel gear 155, while FIG. 13B illustrates a side view horizontal bevel gear 155.

Figure 14B:
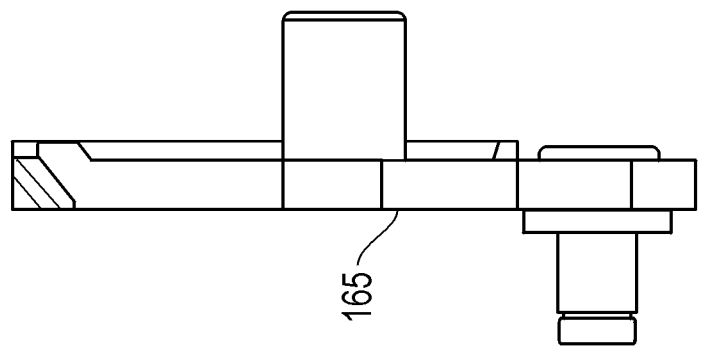
FIGS. 14A-14B illustrate detailed views of a component of FIG. 1.
Figure 14A:
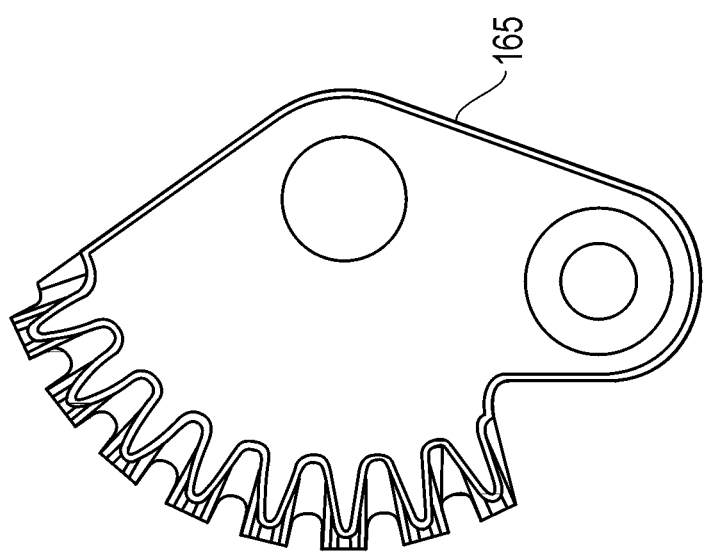

FIGS. 14A-14B illustrate detailed views of horizontal bevel gear 165. FIG. 13A illustrates a top view of horizontal bevel gear 165, while FIG. 13B illustrates a side view horizontal bevel gear 165.

Figure 15:
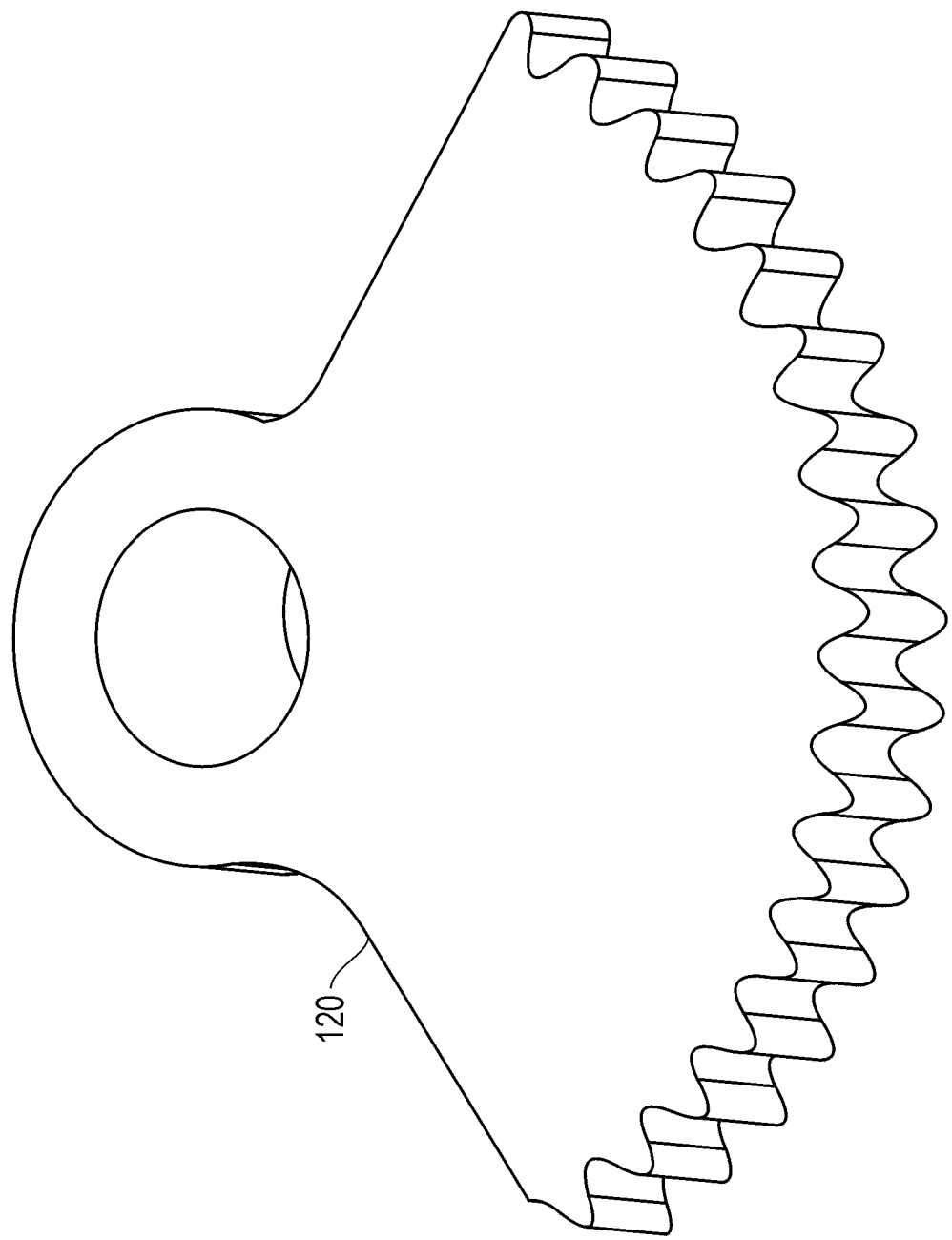
FIGS. 15-18 illustrate detailed views of a component of FIG. 1.
Figure 16:
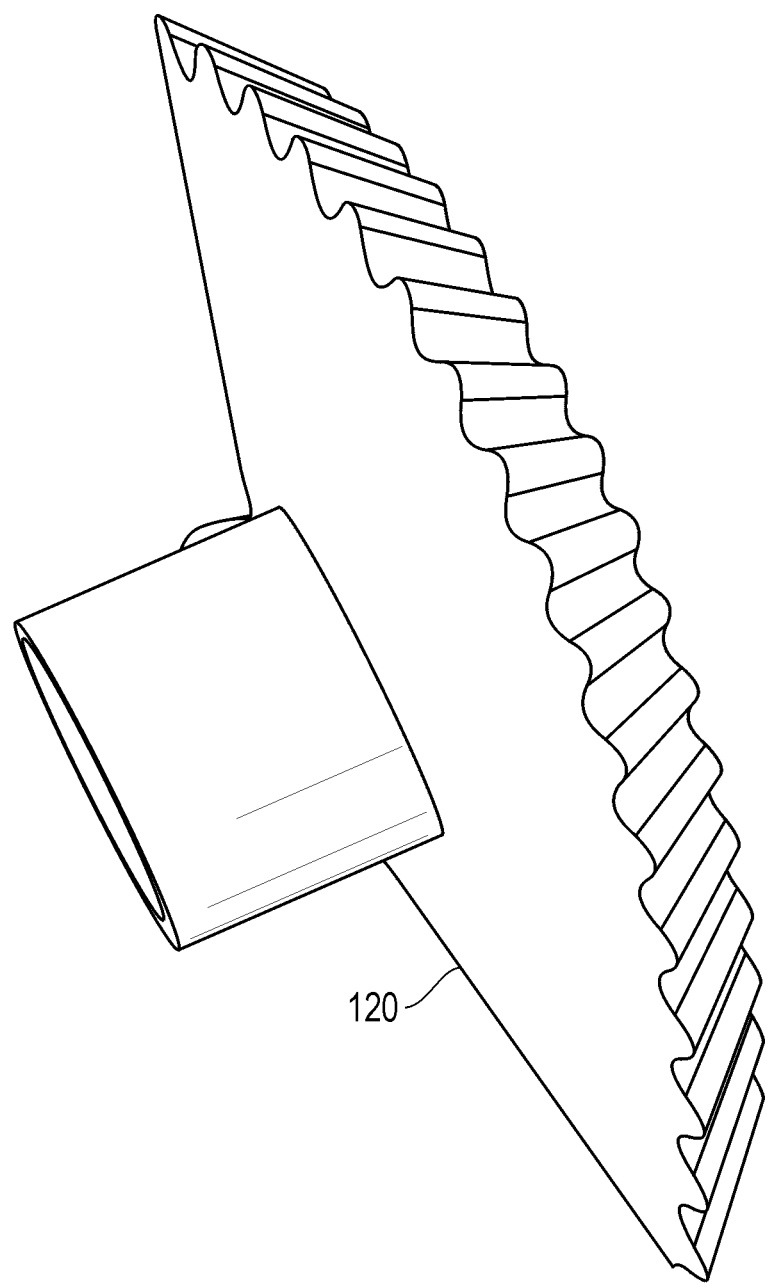
Figure 17:
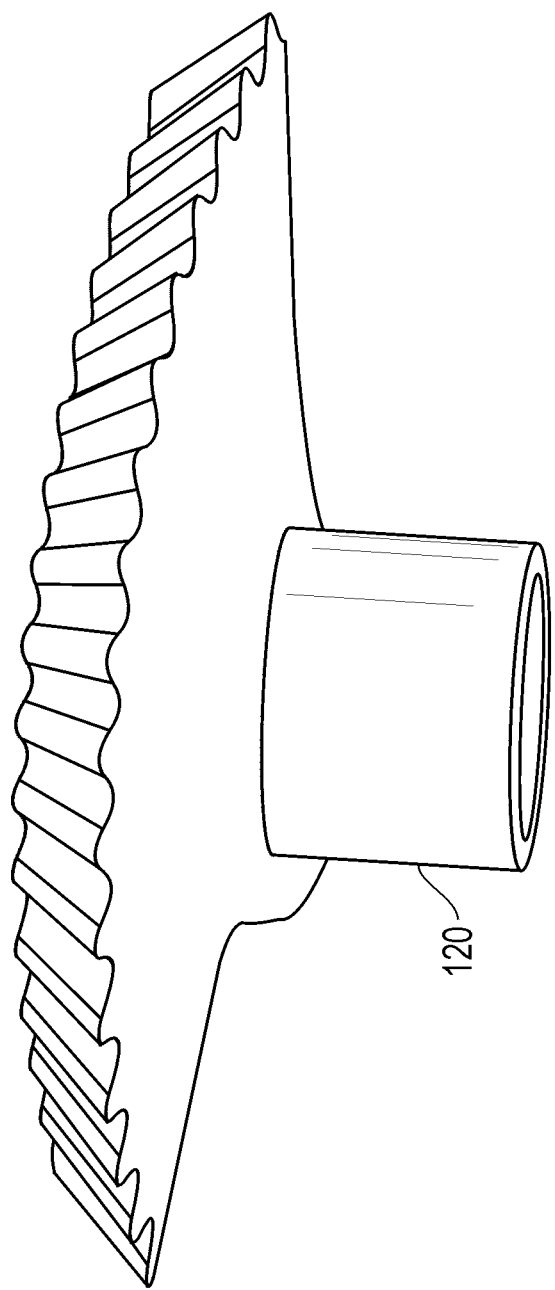
Figure 18:
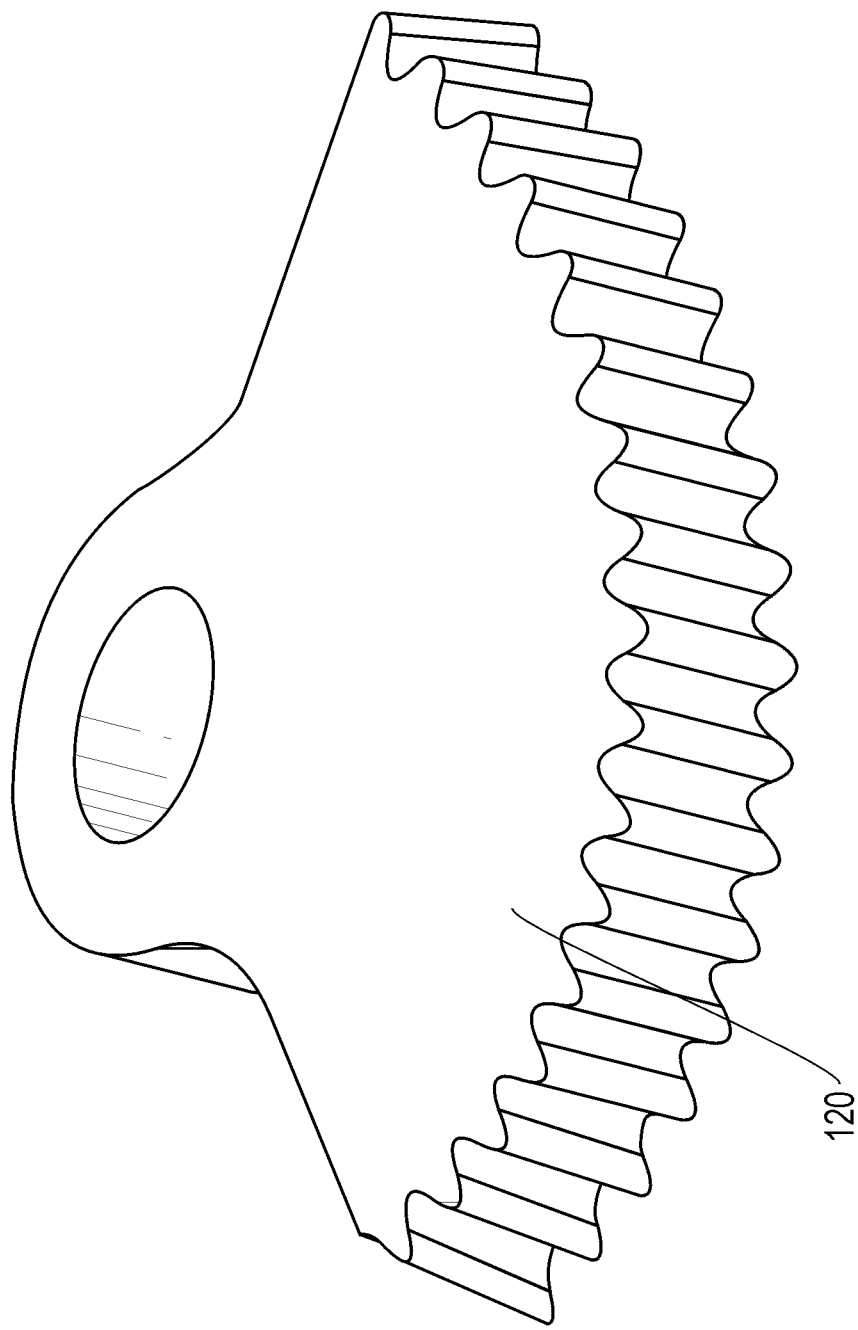

FIGS. 15-18 illustrate detailed views of sector gear 120. FIG. 15 illustrates a top perspective view, FIGS. 16-17 illustrate side views, and FIG. 18 illustrates a front perspective view.

The table shown in FIG. 15 describes the relationship between various portions of the system in one embodiment.

FIG. 19 includes data relating to the geometric and physical relationship of various components in vehicle control system. The data is measured from a starting neutral point with the steering wheel in a position to direct the vehicle straight ahead (i.e., the steering wheel is turned zero degrees). The data in the first column represents the lateral movement of the rack for various positions of the steering wheel, which are shown in the second column. The third column includes data for the rotation of plate 130, and the fourth column includes data for the speed ratio of the two drive wheels. The fifth column provides data for the angle of the front inside wheel (i.e., the front wheel that is closest to the center of a turn). The sixth and seventh columns represent the vertical position (measured in inches) of links 182 and 184 within slots 206 and 208 of drive cams 192 and 194. The data in these columns is measured from a zero point at which the position of links 182 and 184 is not affected by the rotation of drive cams 192 and 194 (i.e., the point of rotation for drive cams 192 and 194.) The data in the eighth column represents the amount of rotation (in degrees) of the inside steering arm 172 or 174. The ninth column includes data on the amount of rotation (in degrees) of the inside pin 202 or 204. The tenth column includes data on the amount of rotation (in degrees) of the outside steering arm 172 or 174, while the eleventh column includes data on the amount of rotation (in degrees) of the outside pin 202 or 204. The twelfth and thirteenth columns include data on the lateral speed of the inside and outside wheels in miles per hour. The fourteenth and fifteenth columns represent the relationship between the angle of the pintle shaft and wheel speed for a linear system hydrostatic transmission.

It should be understood that the present systems and methods are not intended to be limited to the particular forms disclosed. Rather, they are to cover all modifications, equivalents, and alternatives falling within the scope of the claims. For example, although the present systems have been illustrated and described as having cams defined by slots, the cams could also be implemented as plates with appropriately contoured edges along which the relevant followers ride. Thus, those of ordinary skill in the art having the benefit of this disclosure that slots 132 and 134 in plate 130 could also be implemented as shaped sections of the outer edge of plate 130, and followers 142 and 144 could be biased against those shaped edge sections.

The claims are not to be interpreted as including means-plus- or step-plus-function limitations, unless such a limitation is explicitly recited in a given claim using the phrase(s) "means for" or "step for," respectively.

We claim:

1. A vehicle control system comprising:
   a first plate that has two cams and that rotates in a first plane; and
   a pair of drive cam plates coupled to the first plate, both drive cam plates being rotatable at the same time in response to a speed input.

2. The vehicle control system of claim 1, where the first plate has a center of rotation, the two cams are slots in the first plate, and the slots are symmetrical about an axis passing through the center of rotation.

3. The vehicle control system of claim 2, where the first plate is gearless.

4. A vehicle control system comprising:
   a steering pinion;
   a sector gear that engages the pinion;
   a first plate coupled to the sector gear, the first plate rotating in a first plane in response to rotation of the steering pinion; and
   a pair of drive cam plates coupled to the first plate.

5. The vehicle control system of claim 4, where the first plate has two slots, and the system also includes two followers where one follower rides in one of the slots and the other follower rides in the other slot.

6. The vehicle control system of claim 5, where each drive cam plate includes a slot.

\* \* \* \* \*